United States Patent
Cho

(10) Patent No.: US 10,596,735 B2
(45) Date of Patent: Mar. 24, 2020

(54) APPARATUS AND METHOD FOR PRODUCING FIBER COMPOSITE PREFORM

(71) Applicants: Hyundai Motor Company, Seoul (KR); Kia Motors Corporation, Seoul (KR)

(72) Inventor: Jeong Min Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 15/632,608

(22) Filed: Jun. 26, 2017

(65) Prior Publication Data

US 2018/0162020 A1 Jun. 14, 2018

(30) Foreign Application Priority Data

Dec. 13, 2016 (KR) .................... 10-2016-0169552

(51) Int. Cl.
| | | |
|---|---|---|
| *B29C 51/10* | (2006.01) | |
| *B29C 43/18* | (2006.01) | |
| *B29C 43/10* | (2006.01) | |
| *B29C 33/40* | (2006.01) | |
| *B29C 33/04* | (2006.01) | |
| *B29B 11/16* | (2006.01) | |
| *B29C 43/36* | (2006.01) | |
| *B29K 105/08* | (2006.01) | |
| *B29C 70/46* | (2006.01) | |
| *B29C 43/52* | (2006.01) | |

(52) U.S. Cl.
CPC ............ *B29C 43/184* (2013.01); *B29B 11/16* (2013.01); *B29C 33/046* (2013.01); *B29C 33/405* (2013.01); *B29C 43/10* (2013.01); *B29C 43/361* (2013.01); *B29C 43/52* (2013.01); *B29C 70/46* (2013.01); *B29C 2043/3613* (2013.01); *B29K 2105/0809* (2013.01); *B29K 2105/0872* (2013.01)

(58) Field of Classification Search
CPC .......... B29C 45/14; B29C 70/44; B29C 70/48
See application file for complete search history.

(56) References Cited

U.S. PATENT DOCUMENTS

| | | | | |
|---|---|---|---|---|
| 5,151,277 A | * | 9/1992 | Bernardon ............ | B29C 33/302 249/155 |
| 6,089,061 A | * | 7/2000 | Haas ...................... | B21D 37/16 72/14.8 |
| 6,209,380 B1 | * | 4/2001 | Papazian ................ | B21D 37/02 72/413 |
| 6,578,399 B1 | * | 6/2003 | Haas ...................... | B21D 22/10 72/342.1 |

(Continued)

FOREIGN PATENT DOCUMENTS

KR 1019990027606 4/1999

*Primary Examiner* — Joseph S Del Sole
*Assistant Examiner* — Thu Khanh T Nguyen
(74) *Attorney, Agent, or Firm* — Slater Matsil, LLP

(57) ABSTRACT

Disclosed is an apparatus for producing a fiber composite preform. The apparatus includes a lower mold and a molding unit for molding a preform by pressing a fiber composite placed on a surface of the lower mold while the molding unit is deformed in accordance with a shape of the surface of the lower mold.

12 Claims, 5 Drawing Sheets

200(210,211,220,230)
210(212,213,214,215)
230(231,232,233)

(56) References Cited

U.S. PATENT DOCUMENTS

| | | | | |
|---|---|---|---|---|
| 6,637,275 B2 * | 10/2003 | Wu | ............... | G01B 5/207 |
| | | | | 73/862.046 |
| 6,638,275 B1 * | 10/2003 | McGaffigan | ....... | A61B 18/1477 |
| | | | | 606/41 |
| 7,997,891 B2 * | 8/2011 | Gallagher | .......... | B29C 33/0011 |
| | | | | 425/388 |

* cited by examiner

→ gas flow

APPARATUS AND METHOD FOR PRODUCING FIBER COMPOSITE PREFORM

CROSS-REFERENCE TO RELATED APPLICATIONS

The present application claims priority to Korean Patent Application No. 10-2016-0169552, filed Dec. 13, 2016, the entire contents of which is incorporated herein for all purposes by this reference.

TECHNICAL FIELD

The present invention relates generally to an apparatus and a method for producing a fiber composite preform.

BACKGROUND

In general, a fiber composite such as carbon fiber reinforced plastic (CFRP) or glass fiber reinforced plastic (GFRP) prepared by mixing a continuous fiber such as a carbon fiber or a glass fiber with a plastic resin is a composite material having a light weight and excellent mechanical properties, and is thereby used in various fields requiring light-weight properties and mechanical strength.

In recent years, the above fiber composite has replaced steel vehicle parts in the automobile industry, which is required to reduce vehicle weight, so it is being applied to manufacturing of various vehicle parts to reduce vehicle weight.

Resin transfer molding (RTM) and compression molding are mainly used to manufacture vehicle parts such as a hood by using the fiber composite. The above two methods include preforming a semi-finished product such as a dry fabric or a prepreg.

Since a produced preform has a high impact on quality of a final product, it is advantageous to mold the preform to have a shape as similar as possible to the final product.

Conventionally, a hand layup method or an apparatus comprised of upper and lower molds is used for producing the preform.

However, the hand layup is problematic in that quality of the preform varies with skill of an operator and it requires long manufacturing time. In the conventional apparatus, when the preform has a complicated shape, unmolded portions are generated. In addition, when the shape of the preform is required to be changed, both the upper and lower molds must be replaced, thereby causing an increase in costs.

The foregoing is intended merely to aid in the understanding of the background of the present invention, and is not intended to mean that the present invention falls within the purview of the related art that is already known to those skilled in the art.

SUMMARY

The present invention relates generally to an apparatus and a method for producing a fiber composite preform. In particular embodiments, the present invention relates to an apparatus and a method for producing a fiber composite preform, wherein the apparatus can be used for molding a complicated shape such as a vehicle part using the fiber composite, and can realize improved moldability of the preform and can achieve easy replacement of a mold. As such, embodiments of the present invention can solve problems occurring in the related art. Embodiments of the apparatus are capable of reducing manufacturing time of the preform and of achieving easy replacement of a mold.

According to one aspect of the present invention, an apparatus can be used for producing a fiber composite preform. The apparatus includes a lower mold and a molding unit for molding a preform by pressing a fiber composite placed on a surface of the lower mold while the molding unit is deformed in accordance with a shape of the surface of the lower mold.

The molding unit may include a box-shaped pressing body having an inner space therein and having a plurality of gas flow holes at a bottom surface thereof. A pressing part can be provided at a lower side of the pressing body, and configured to press and mold the fiber composite while the pressing part is deformed in accordance with the shape of the surface of the lower mold. A lifting cylinder has a rod coupled to a plane surface of the pressing body, so the rod extends in a direction toward the lower mold. A temperature adjusting part is provided at the pressing body and supplies gas to the inner space of the pressing body, such that the pressing part is heated and cooled.

The pressing part may include a pressing sheet made of a flexible material and of which an end is provided at the lower side of the pressing body, the pressing sheet coming into contact with the fiber composite. The pressing part may also include a plurality of molding balls filled in the pressing sheet.

The pressing part may further include a plurality of pressing cylinders provided at the bottom surface of the pressing body to be spaced apart from each other in a width direction of the pressing body, so that the pressing cylinders press the molding balls filled in a plurality of pressing regions divided in the width direction of the pressing body, with a preset molding pressure of each of the pressing regions.

The pressing cylinders may individually extend in accordance with the shape of the surface of the lower mold.

The pressing part may further include: at least one tension adjusting roller provided in the pressing body and to which the end of the pressing sheet is coupled to be rolled up, the tension adjusting roller functioning to maintain constant tension of the pressing sheet.

The pressing body may be provided with the plurality of gas flow holes at the bottom surface thereof, and the temperature adjusting part may include: a first gas inlet through which gas is supplied to the inner space of the pressing body, such that the pressing part is heated; a second gas inlet through which gas having a temperature lower than that of gas supplied through the first gas inlet is supplied, such that the pressing part is cooled; and a gas outlet through which gas introduced through the first and second gas inlets is discharged.

According to another aspect of the present invention, there is provided a method for producing a fiber composite preform, the method including: a preparing step of placing a fiber composite on a surface of a lower mold; a first molding step of firstly pressing the fiber composite by lowering a pressing part in a direction toward the surface of the lower mold, so that the pressing part comes into contact with a surface of the fiber composite; a setting step of setting a molding pressure for each of pressing regions in accordance with depth and location of a depression of the lower mold, with respect to pressing regions divided at regular intervals in a width direction of the lower mold; and a second molding step of secondarily pressing the fiber composite in accordance with the molding pressure by transmitting an actuating signal to a plurality of pressing cylinders respectively provided at the pressing regions, thereby producing a preform.

The method may further include a heating step of heating the fiber composite in contact with the pressing part by supplying hot gas to an inner space of the pressing part prior to the second molding step, thereby increasing moldability of the fiber composite.

The method may further include a finishing step of cooling and unloading the preform in contact with the pressing part by supplying cold gas having a temperature lower than that of the hot gas to the inner space of the pressing part after the second molding step.

According to the embodiment of the present invention, it is possible to efficiently mold a preform having a complicated shape, and to improve quality of a final product by minimizing occurrence of defects such as unmolded portions.

Further, According to the embodiment of the present invention, it is possible to reduce manufacturing time, thereby improving productivity, and to reduce costs of replacing a mold.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
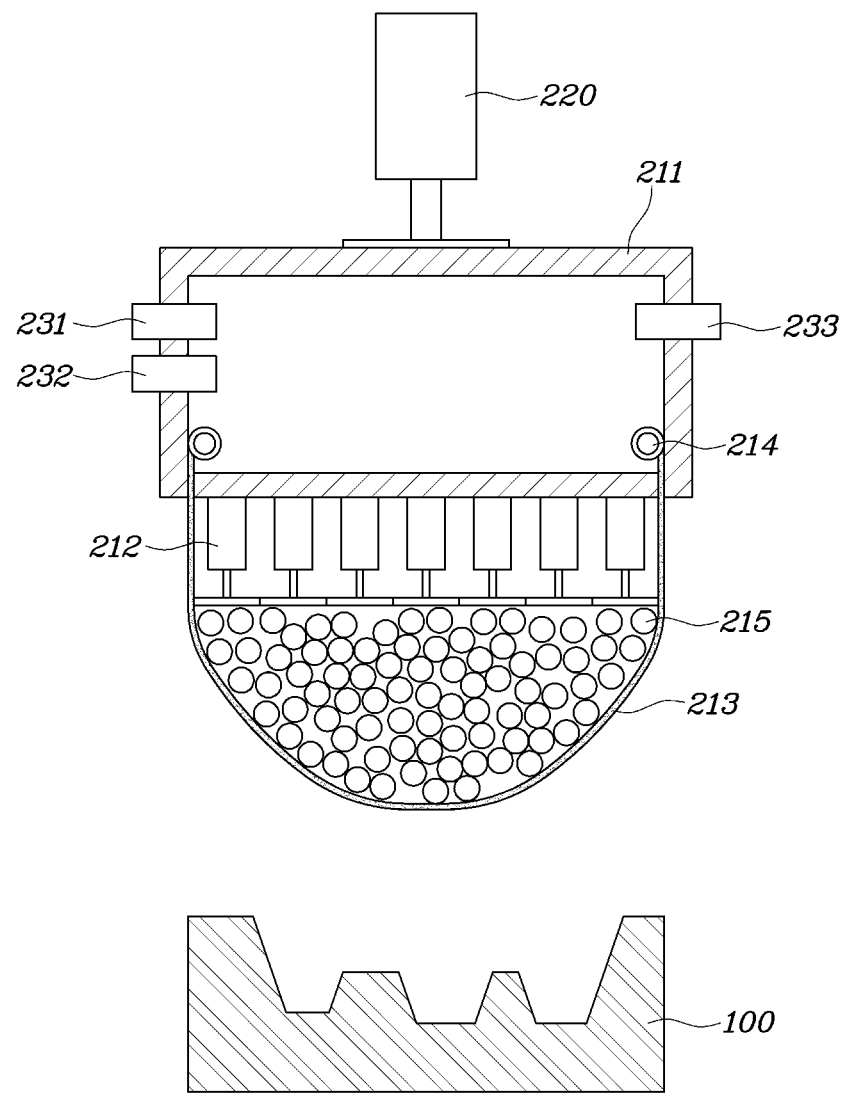
FIG. 1 is a cross-sectional view showing an apparatus for producing a fiber composite preform according to an embodiment of the present invention.

Hereinbelow, exemplary embodiments of the present invention will be described in detail with reference to the accompanying drawings. Various changes to the following embodiments are possible and the scope of the present invention is not limited to the following embodiments. Embodiments of the present invention are presented to make complete disclosure of the present invention and help those who are ordinarily skilled in the art best understand the invention. Throughout the drawings, the same reference numerals will refer to the same or like parts.

FIG. 1 is a cross-sectional view showing an apparatus for producing a fiber composite preform according to an embodiment of the present invention.

As shown in FIG. 1, the apparatus for producing the fiber composite preform according to the embodiment of the present invention includes a lower mold 100 and a molding unit 200 molding the preform by pressing a molding material placed on a surface of the lower mold 100 while the molding unit 200 is deformed in accordance with a shape of the surface of the lower mold 100.

In the present invention, the molding material may be a fiber composite selected from carbon fiber reinforced plastic (CFRP) or glass fiber reinforced plastic (GFRP) or a semi-finished product such as a dry fabric or a prepreg.

Here, the molding unit 200 according to the embodiment of the present invention is configured such that a lower part thereof, which comes into contact with the fiber composite placed on the surface of the lower mold 100 to press and mold the fiber composite, is formed in an irregular-shape, so that the lower part of the molding unit 200 is deformed in accordance with the shape of the surface of the lower mold 100.

Figure 2:
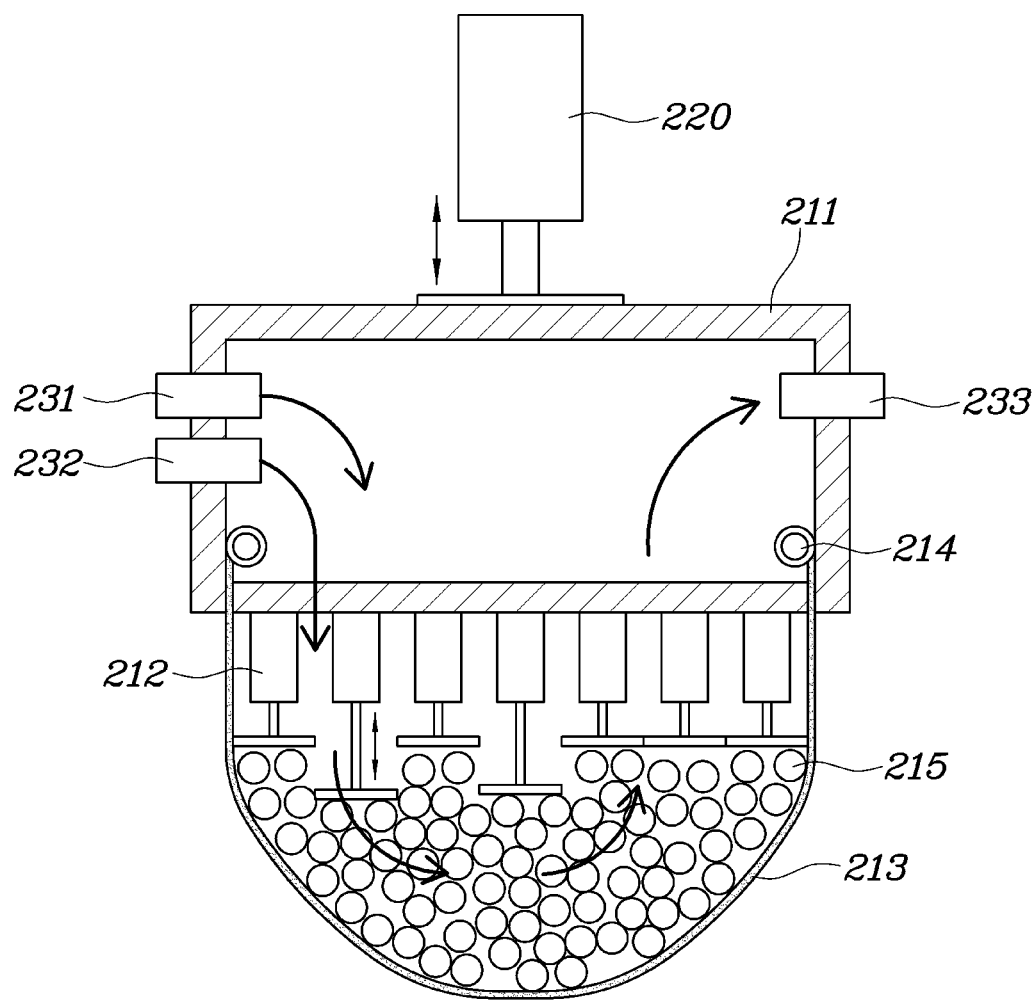
FIG. 2 is a view showing a molding unit according to the embodiment of the present invention.
Figure 3:
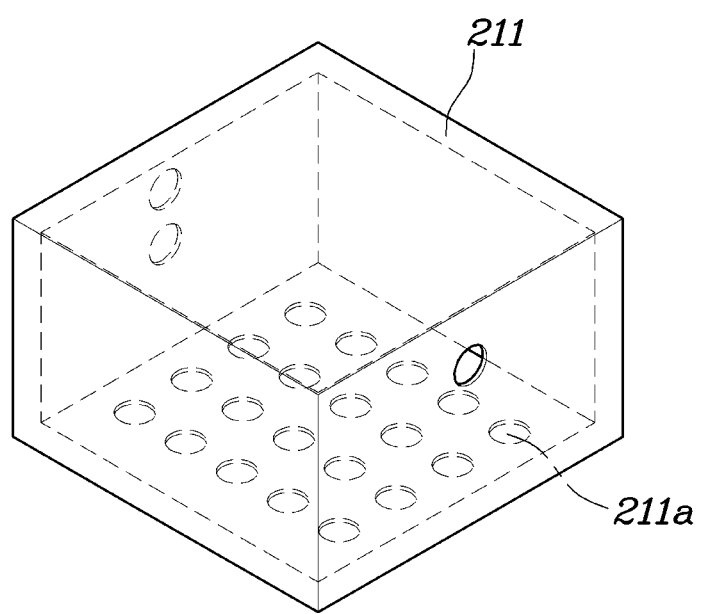
FIG. 3 is a perspective view showing a pressing body according to the embodiment of the present invention.

FIG. 2 is a view showing the molding unit 200 according to the embodiment of the present invention.

As shown in FIG. 2, the molding unit 200 according to the embodiment of the present invention includes a box-shaped pressing body 211 having an inner space therein, a pressing part 210 provided at a lower side of the pressing body 211, and configured to press and mold the fiber composite while the pressing part 210 is deformed in accordance with the shape of the surface of the lower mold 100, a lifting cylinder 220 of which a rod is coupled to a plane surface of the pressing body 211, so the rod extends in a direction toward the lower mold 100, and a temperature adjusting part 230 provided at the pressing body 211 and allowing the pressing part 210 to be heated and cooled.

The pressing body 211 may be provided with a plurality of gas flow holes 211a at a bottom surface thereof. Due to this, gas flowing into the inner space of the pressing body 211 through the temperature adjusting part 230 comes into direct contact with the pressing part 210 provided at the lower side of the pressing body 211, whereby temperature of the pressing part 210 can be quickly increased or decreased.

The pressing part 210 according to the embodiment of the present invention includes a pressing sheet 213 provided at the lower side of the pressing body 211 and a plurality of molding balls 215 filled in a space formed between the bottom surface of the pressing body 211 and the pressing sheet 213.

The pressing sheet 213 according to the embodiment of the present invention may be made of a flexible material such as fabric cloth or vinyl, and more preferably a material having elasticity and flexibility at the same time.

Thus, when the fiber composite is press-molded, the pressing sheet 213 can be easily deformed in accordance with the shape of the surface of the lower mold 100, and the pressing sheet 213 can maintain tension force upon deformation, thereby improving moldability of the fiber composite.

Here, the molding balls 215 according to the embodiment of the present invention may be made of an elastic material such as rubber.

Thus, the molding balls 215 can be easily restored to their initial state after the molding balls 215 press the fiber composite to be molded, thereby minimizing reuse time, and the molding balls 215 can be deformed to some extent to press the fiber composite, thereby improving quality of molding of a preform to be produced.

Moreover, the molding balls 215 according to the embodiment of the present invention may have a diameter of 3 to 5 mm.

When a diameter of the molding balls 215 is less than 3 mm, it is difficult to secure elastic force of the molding balls 215. Accordingly, restoring force is lowered after molding, thereby increasing reuse time, and it takes a long time for the temperature adjusting part 230 to adjust temperature, thereby lowering productivity. When the diameter of the molding balls 215 is more than 5 mm, voids formed between the molding balls 215 are increased, thereby causing defects such as unmolded portions due to voids when manufacturing a preform having a relatively complicated structure.

The lifting cylinder 220 according to the embodiment of the present invention is coupled by the rod thereof to the plane surface of the pressing body 211 coupled to the pressing part 210 at the bottom surface thereof, such that the rod of the lifting cylinder 220 extends in the direction toward the lower mold 100.

Here, various types of cylinders such as a pneumatic cylinder or a hydraulic cylinder may be selectively used as the lifting cylinder 220 according to the embodiment of the present invention.

The temperature adjusting part 230 according to the embodiment of the present invention may include a first gas inlet 231 through which hot gas is supplied to the inner space of the pressing body 211, a second gas inlet 232 through which cold gas is supplied to the inner space of the pressing body 211, and a gas outlet 233 through which gas introduced through the first and second gas inlets 231 and 232 is discharged.

Accordingly, gas introduced into the inner space of the pressing body 211 through the first and second gas inlets 231 and 232 is heat-exchanged with the molding balls 215 and the pressing sheet 213 through the gas flow holes 211a, such that temperatures of the molding balls 215 and the pressing sheet 213 can be adjusted, whereafter heat-exchanged gas is discharged to the outside through the gas outlet 233. Thus, it is possible to facilitate production of the preform.

Here, gas used in the present invention may be an inert gas such as argon (Ar) gas or nitrogen ($N_2$) gas. This is because gas should not affect quality of the fiber composite by reacting therewith, or safety accidents such as explosion should not occur at a high temperature.

The molding unit 200 according to the embodiment of the present invention may further include a plurality of pressing cylinders 212 provided at the bottom surface of the pressing body 211 to be spaced apart from each other in a width direction of the pressing body 211 by a regular interval. Here, each of the pressing cylinders 212 may individually extend, so that the pressing cylinders 212 press the molding balls 215 in accordance with the shape of the surface of lower mold 100, with a preset molding pressure.

Here, by varying molding pressure for pressing the molding balls 215 filled in a plurality of pressing regions divided in the width direction of the pressing body 211, in accordance with the shape of the surface of the lower mold 100, it is possible to mold a preform having a complicated shape, and to improve quality of the preform to be produced.

In addition, the molding unit 200 according to the embodiment of the present invention may include at least one tension adjusting roller 214 provided in the inner space of the pressing body 211 and to which the end of the pressing sheet 213 is coupled to be rolled up.

Accordingly, tension force of the pressing sheet 213 can be kept constant while the end of the pressing sheet 213 is withdrawn or rolled up in accordance with a shape of the pressing sheet 213, which is deformable at the time of molding.

In other words, when the lower mold wo has a plurality of bent portions at the surface thereof, the end of the pressing sheet 213 is withdrawn. When the bent portions are few, the end of the pressing sheet 213 is rolled up. Thus, tension force of the pressing sheet 213 is kept constant, thereby improving moldability of the fiber composite and achieving consistent quality of molding.

As described above, the apparatus for producing the fiber composite preform according to the embodiment of the present invention is capable of molding a preform having a complicated shape and of improving quality of a final product to be produced by minimizing occurrence of defects such as unmolded portions.

In addition, since only the lower mold 100 is replaced at the time of replacement of mold, it is possible to reduce costs of replacing a mold.

Hereinafter, a method for producing a preform using the apparatus for producing the fiber composite preform according to an embodiment of the present invention will be described with reference to the drawings.

Figure 4:
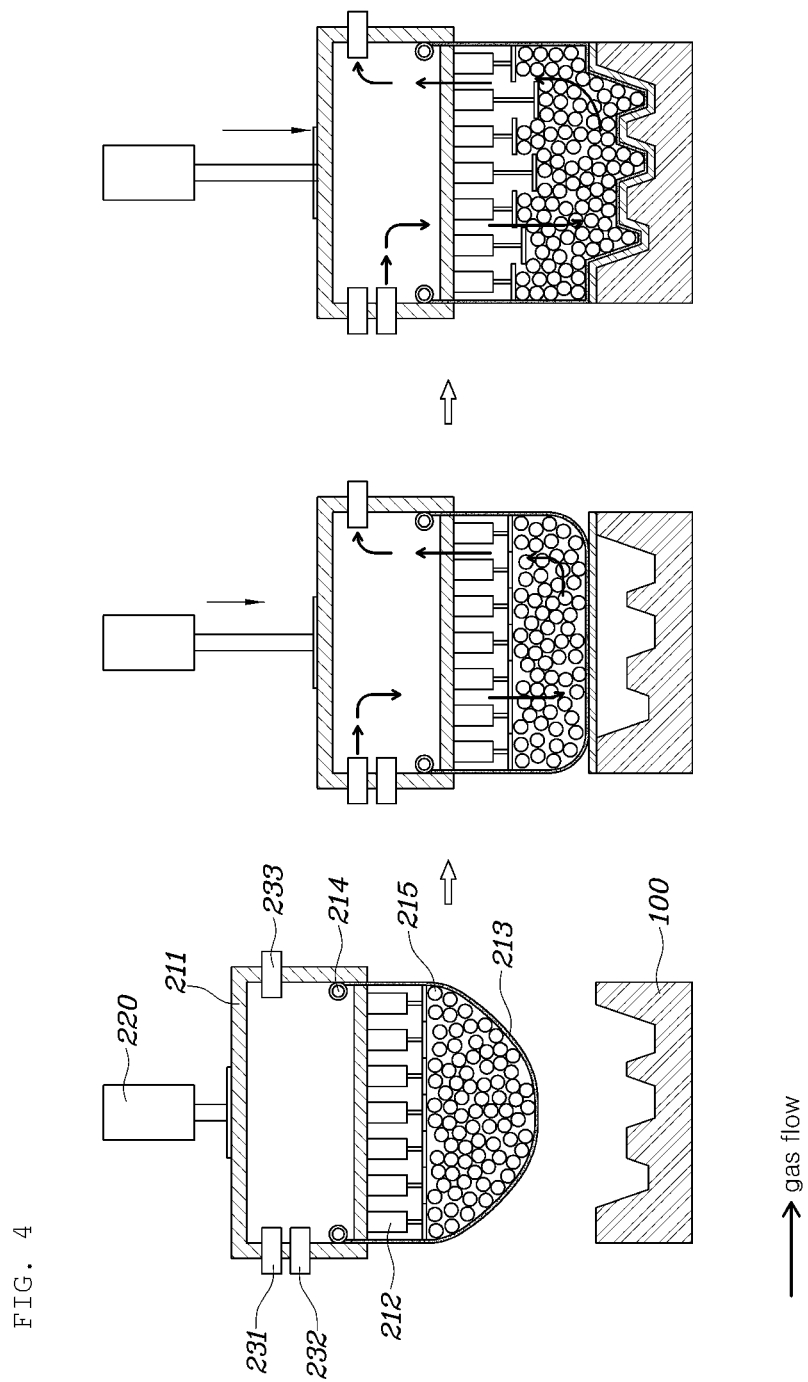
FIG. 4 is a view showing operation of the apparatus for producing the fiber composite preform.
Figure 5:
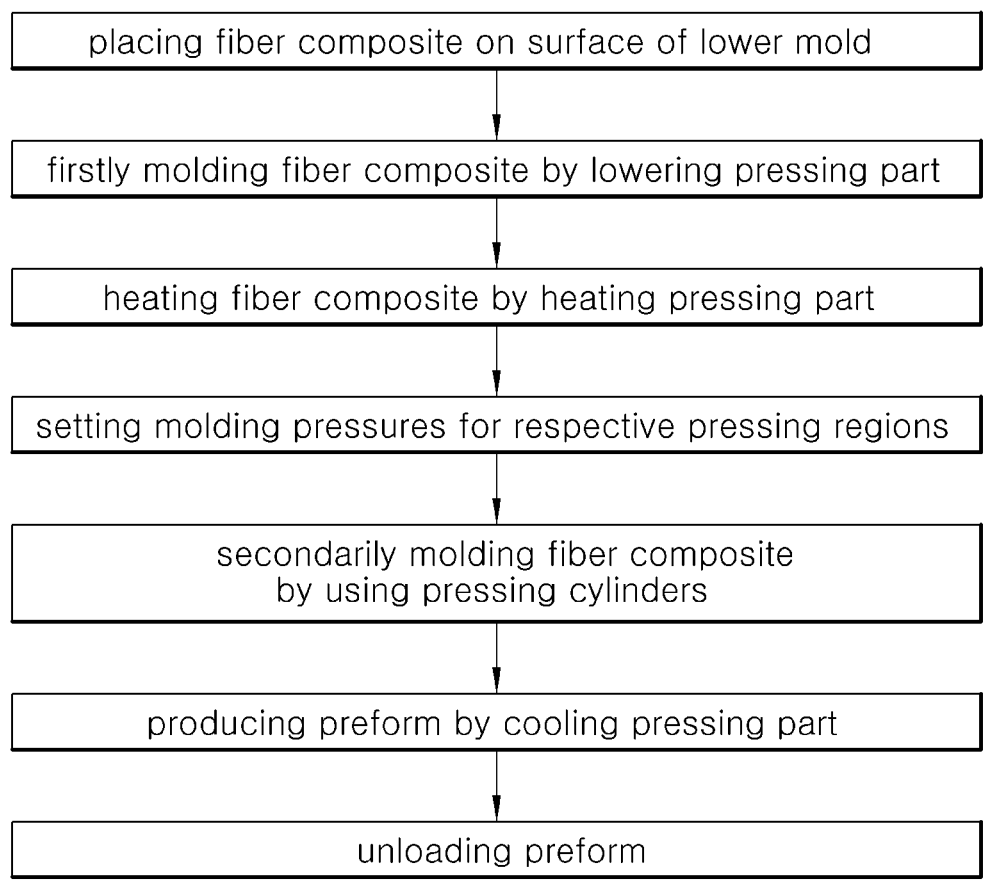
FIG. 5 is a flow chart showing a method for producing the fiber composite preform.

FIG. 4 is a view showing operation of the apparatus for producing the fiber composite preform according to the embodiment of the present invention, and FIG. 5 is a flow chart showing the method for producing the fiber composite preform according to the embodiment of the present invention.

As shown in FIGS. 4 and 5, the method according to the embodiment of the present invention largely comprises a preparing step, a first molding step, and a second molding step.

The preparing step is carried out by placing the fiber composite such as carbon fiber reinforced plastic (CFRP) or glass fiber reinforced plastic (GFRP), or the semi-finished product such as the dry fabric or the prepreg between the molding unit 200 and the lower mold 100. The fiber composite is placed on the surface of the lower mold 100 depressed in accordance with a shape of a preform to be produced.

When the preparing step is completed, the rod of the lifting cylinder 220 extends in the direction toward the lower mold 100 to lower the pressing body 211 coupled to an end of the rod, whereafter the pressing part 210 provided at the lower side of the pressing body 211 firstly presses a plane surface of the fiber composite, thereby molding a preform having a rough shape.

When the first molding step is completed, in a setting step of setting molding pressure, molding pressure for each of the pressing regions is set in accordance with height of a protrusion or depth and location of a depression of the lower mold 100, with respect to pressing regions virtually divided at regular intervals in a width direction of the lower mold 100.

In other words, molding pressure is set for each of the pressing regions so that a depression having a deep depth of the lower mold 100 is pressed with high pressure, and a depression having a relatively low depth is pressed with pressure lower than that of the depression having the deep depth.

When molding pressure is set as described above, in the second molding step, the fiber composite is secondarily pressed in accordance with molding pressure set for each of the pressing regions by transmitting an actuating signal to the plurality of pressing cylinders 212 that respectively corresponds to the pressing regions, thereby producing a preform.

Here, since the pressing cylinders 212 extend individually in accordance with a preset molding pressure, molding pressure for each of the pressing regions can be adjusted differently from each other in accordance with depth and location of the depression of the lower mold 100. Thus, it is possible to manufacture a preform having a complicated shape and to improve quality of the preform to be produced.

The method for producing the fiber composite preform according to the embodiment of the present invention may further include a heating step of heating the fiber composite prior to the second molding step, and a finishing step of cooling and unloading the produced preform after the second molding step.

The heating step is carried out by supplying hot gas and heating the firstly molded fiber composite to facilitate molding. The hot gas introduced through the first gas inlet 231 flows through the gas flow holes 211*a* to heat the molding balls 215 and the pressing sheet 213, whereby the fiber composite in contact with the pressing sheet 213 is heated.

Accordingly, moldability of the fiber composite can be improved, thereby facilitating molding in the second molding step and improving quality of molding.

The finishing step is carried out by cooling and unloading the preform produced by secondarily molding the fiber composite heated to facilitate molding.

At this time, gas having a temperature lower than that of gas supplied to the first gas inlet 231 is supplied through the second gas inlet 232 to the preform, which is heated by gas supplied through the first gas inlet 23, to be cooled.

Thus, cooling time of the preform can be reduced, whereby it is possible to improve productivity.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for producing a fiber composite preform, the apparatus comprising:
    a lower mold; and
    a molding unit configured to mold a preform by pressing a fiber composite placed on a surface of the lower mold while the molding unit is deformed in accordance with a shape of the surface of the lower mold;
    wherein the molding unit includes a box-shaped pressing body having an inner space therein and having a plurality of gas flow holes at a bottom surface thereof and a pressing part provided at a lower side of the pressing body and configured to press and mold the fiber composite while the pressing part is deformed in accordance with the shape of the surface of the lower mold, wherein the pressing part includes:
        a pressing sheet made of a flexible material and of which an end is provided at the lower side of the pressing body, the pressing sheet coming into contact with the fiber composite;
        a plurality of molding balls filled in the pressing sheet; and
        a tension adjusting roller provided in the pressing body and to which the end of the pressing sheet is coupled to be rolled up, the tension adjusting roller configured to function to maintain constant tension of the pressing sheet.

2. The apparatus of claim 1, wherein the molding unit further includes:
    a lifting cylinder having a rod coupled to a plane surface of the pressing body, so the rod extends in a direction toward the lower mold; and
    a temperature adjusting part provided at the pressing body and configured to supply gas to the inner space of the pressing body, such that the pressing part is heated and cooled.

3. The apparatus of claim 1, wherein the pressing part further includes a plurality of pressing cylinders provided at the bottom surface of the pressing body to be spaced apart from each other in a width direction of the pressing body, so that the pressing cylinders can press the molding balls filled in a plurality of pressing regions divided in the width direction of the pressing body with a preset molding pressure of each of the pressing regions.

4. The apparatus of claim 3, wherein the pressing cylinders individually extend in accordance with the shape of the surface of the lower mold.

5. The apparatus of claim 2, wherein the temperature adjusting part includes:
    a first gas inlet through which gas is supplied to the inner space of the pressing body, such that the pressing part can be heated;
    a second gas inlet through which gas having a temperature lower than that of gas supplied through the first gas inlet is supplied, such that the pressing part can be cooled; and
    a gas outlet through which gas introduced through the first and second gas inlets is discharged.

6. The apparatus of claim 2, wherein the pressing body is provided with the plurality of gas flow holes at the bottom surface thereof.

7. An apparatus for producing a fiber composite preform, the apparatus comprising:
    a lower mold; and
    a molding unit configured to mold a preform by pressing a fiber composite placed on a surface of the lower mold, setting a molding pressure for each of a plurality of pressing regions in accordance with a depth and location of a depression of the lower mold, and pressing the fiber composite in accordance with the molding pressure by transmitting an actuating signal to a plurality of pressing cylinders provided at the pressing regions,
    wherein the molding unit includes a box-shaped pressing body having an inner space therein and having a plurality of gas flow holes at a bottom surface thereof;
    a pressing part provided at a lower side of the pressing body, and configured to press and mold the fiber composite while the pressing part is deformed in accordance with a shape of the surface of the lower mold, wherein the pressing part includes:
        a pressing sheet made of a flexible material and of which an end is provided at the lower side of the pressing body, the pressing sheet coming into contact with the fiber composite; a plurality of molding balls filled in the pressing sheet; and
        a tension adjusting roller provided in the pressing body and to which the end of the pressing sheet is coupled to be rolled up, the tension adjusting roller configured to function to maintain constant tension of the pressing sheet.

8. The apparatus of claim 7, wherein the pressing regions are divided at regular intervals in a width direction of the lower mold.

9. The apparatus of claim 7, wherein the molding unit further includes:
    a lifting cylinder having a rod coupled to a plane surface of the pressing body, so the rod extends in a direction toward the lower mold; and
    a temperature adjusting part provided at the pressing body and configured to supply gas to the inner space of the pressing body, such that the pressing part is heated and cooled.

10. The apparatus of claim 9, wherein the pressing part further includes:
    a plurality of pressing cylinders provided at the bottom surface of the pressing body to be spaced apart from each other in a width direction of the pressing body, so that the pressing cylinders can press the molding balls filled in the plurality of pressing regions with a corresponding molding pressure of each of the pressing regions.

11. The apparatus of claim 9, wherein the temperature adjusting part includes:
   a first gas inlet through which gas is supplied to the inner space of the pressing body, such that the pressing part can be heated;
   a second gas inlet through which gas having a temperature lower than that of gas supplied through the first gas inlet is supplied, such that the pressing part can be cooled; and
   a gas outlet through which gas introduced through the first and second gas inlets is discharged.

12. The apparatus of claim 9, wherein the pressing body is provided with the plurality of gas flow holes at the bottom surface thereof.

* * * * *